United States Patent
Lee et al.

(10) Patent No.: US 10,180,751 B2
(45) Date of Patent: Jan. 15, 2019

(54) SENSING DEVICE FOR FORCE AND TACTILE-PROXIMITY SENSING

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 18 days.

(21) Appl. No.: 15/414,119

(22) Filed: Jan. 24, 2017

(65) Prior Publication Data

US 2017/0228086 A1    Aug. 10, 2017

(30) Foreign Application Priority Data

Feb. 5, 2016   (TW) .............................. 105103972 A

(51) Int. Cl.
*G06F 3/041*     (2006.01)
*G06F 3/01*      (2006.01)
*G06F 3/044*     (2006.01)

(52) U.S. Cl.
CPC ............ *G06F 3/0416* (2013.01); *G06F 3/016* (2013.01); *G06F 3/044* (2013.01); *G06F 2203/04101* (2013.01); *G06F 2203/04102* (2013.01); *G06F 2203/04105* (2013.01); *G06F 2203/04107* (2013.01)

(58) Field of Classification Search
CPC ........ G06F 3/0416; G06F 3/016; G06F 3/044; G06F 2203/04101; G06F 2203/04102; G06F 2203/04105; G06F 2203/04107
See application file for complete search history.

(56) References Cited

U.S. PATENT DOCUMENTS

| | | | |
|---|---|---|---|
| 2011/0018826 A1* | 1/2011 | Shoji ....................... | G06F 3/044 345/173 |
| 2014/0078108 A1* | 3/2014 | Hotelling ............... | G06F 3/0416 345/174 |
| 2014/0320769 A1* | 10/2014 | Masuda .................. | G06F 3/044 349/12 |

(Continued)

*Primary Examiner* — Sahlu Okebato
(74) *Attorney, Agent, or Firm* — Chun-Ming Shih; HDLS IPR Services

(57) ABSTRACT

A sensing device for force and tactile-proximity sensing includes an upper substrate, a lower substrate, a first electrode layer having a plurality of first sensing electrodes, a second electrode layer having at least one second sensing electrode, a dielectric layer arranged between the upper substrate and the lower substrates, and a capacitance sensing circuit. In tactile-proximity sensing operation, the capacitance sensing circuit sends a touch control capacitance-exciting signal to a selected first sensing electrode and obtains a tactile-proximity sensing signal therefrom, wherein an tactile-proximity auxiliary signal with same phase as the touch control capacitance-exciting signal is sent to the at least one corresponding second sensing electrode. In force sensing operation, the capacitance sensing circuit sends a force capacitance-exciting signal to the corresponding second sensing electrode and obtains a force sensing signal therefrom, wherein a force counter-exciting signal is also sent to the selected first sensing electrode.

27 Claims, 12 Drawing Sheets

(56) References Cited

U.S. PATENT DOCUMENTS

| | | | |
|---|---|---|---|
| 2014/0368753 A1* | 12/2014 | Cheng | G06F 1/1643 349/12 |
| 2015/0296062 A1* | 10/2015 | Lee | G02F 1/133345 455/566 |
| 2016/0085334 A1* | 3/2016 | Hashimoto | G06F 3/044 345/174 |

* cited by examiner

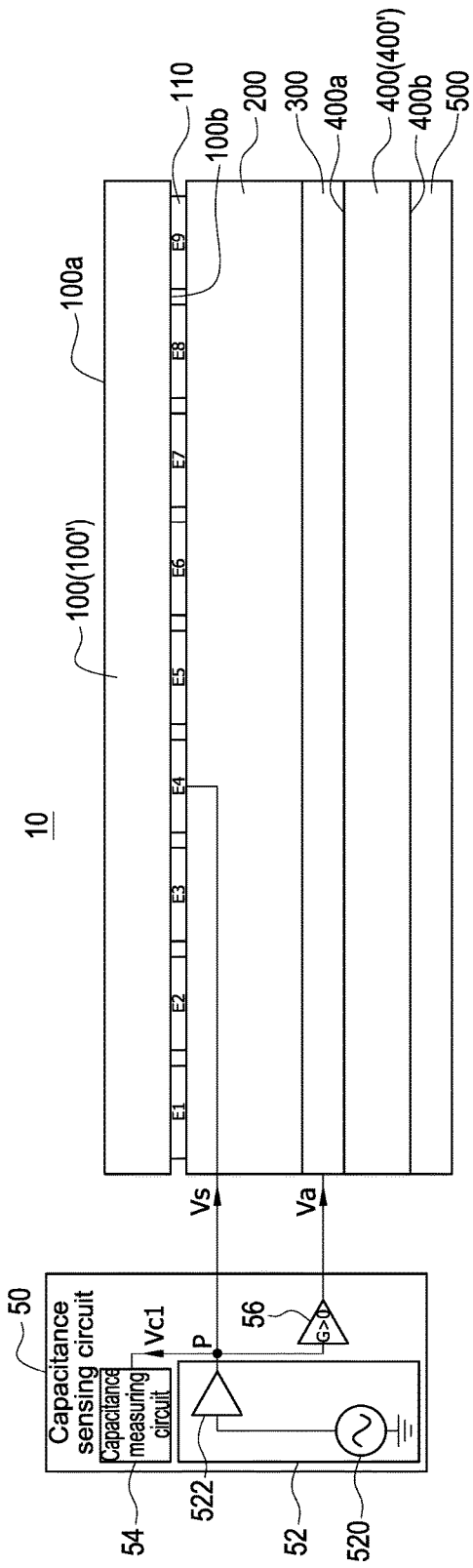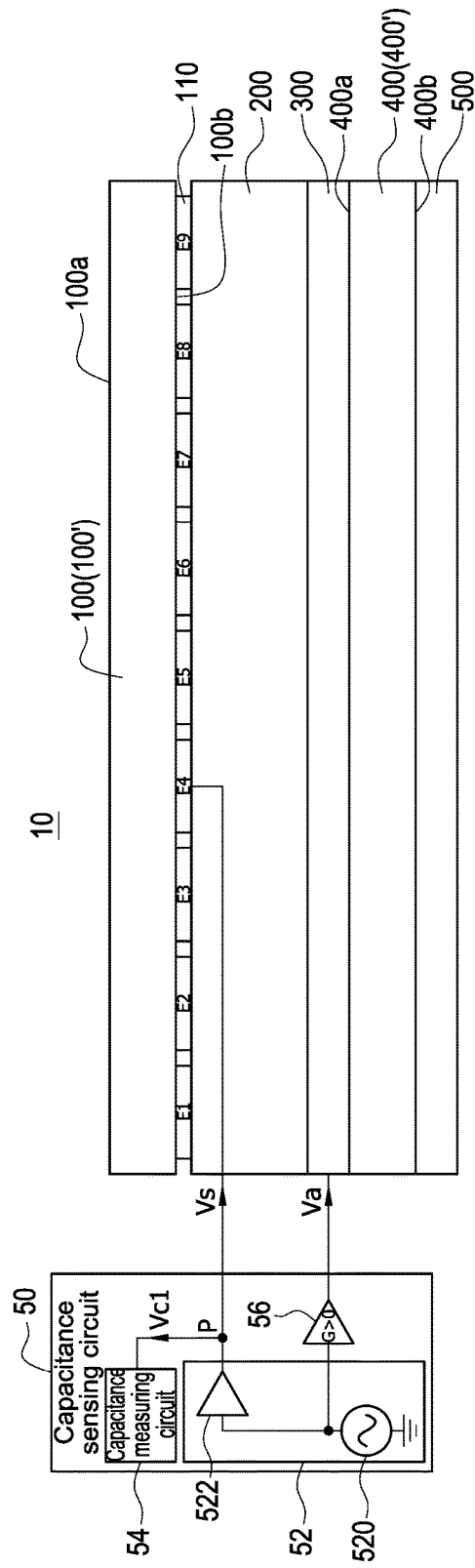
FIG.1A
FIG.1B

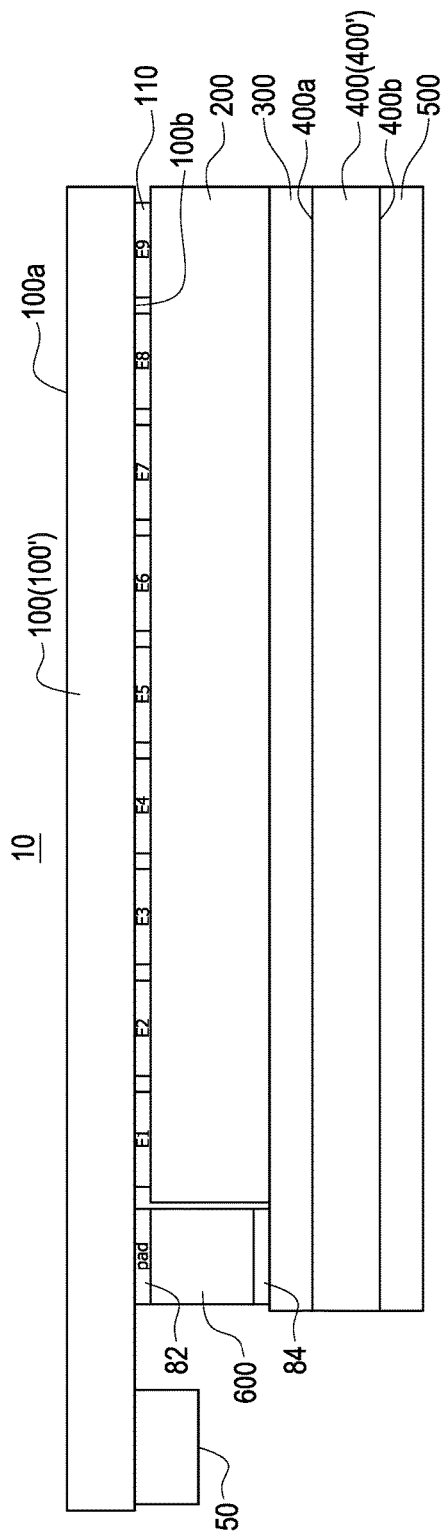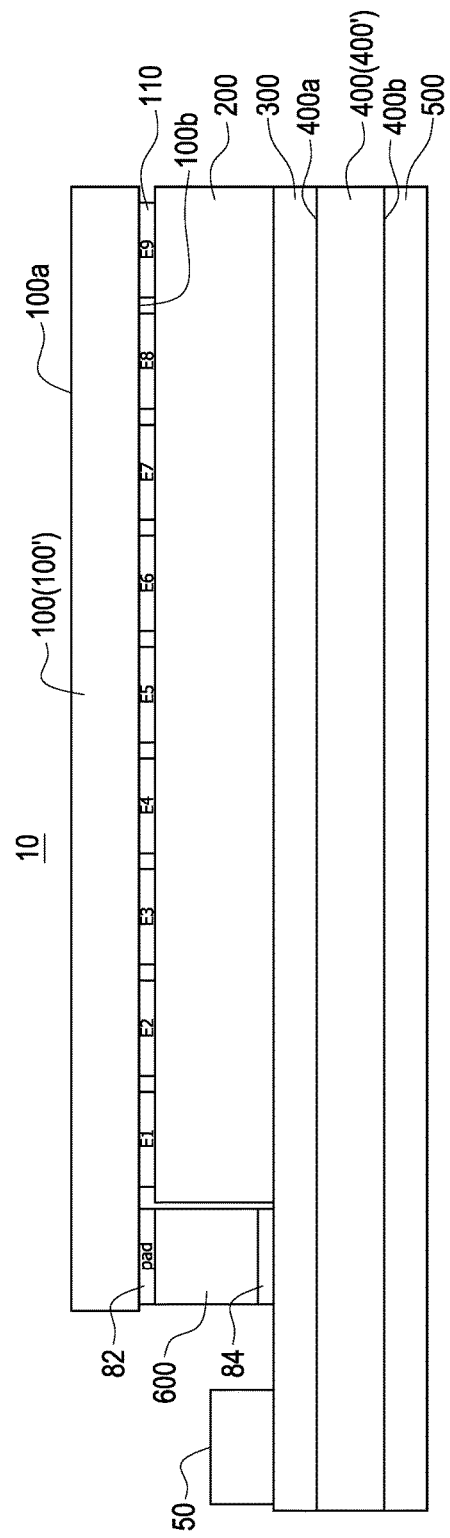

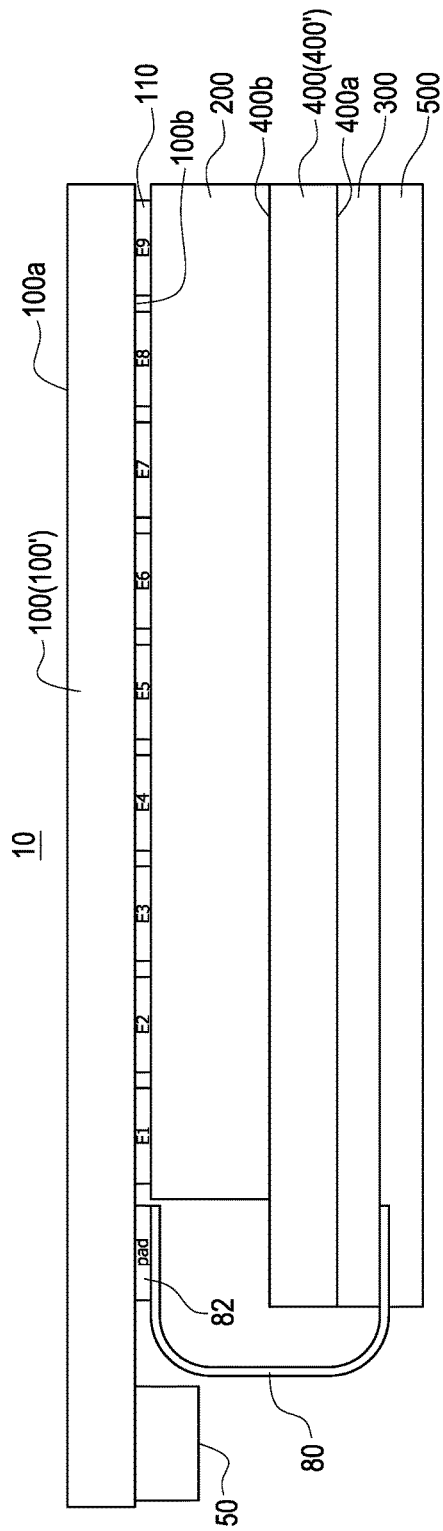
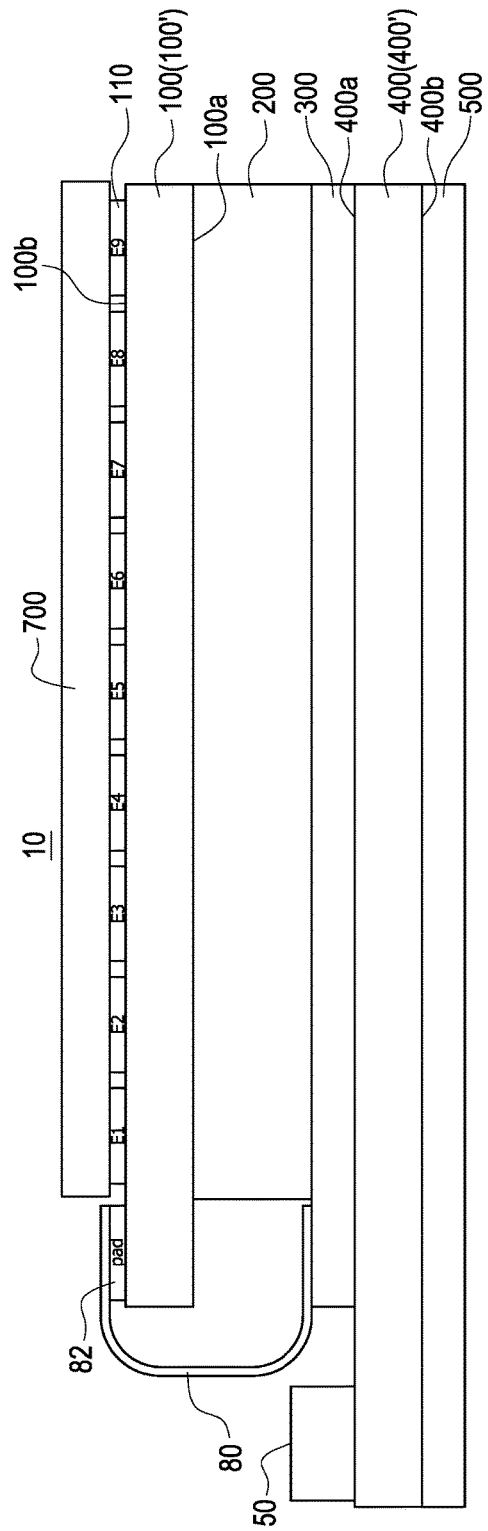
FIG.5A
FIG.5B

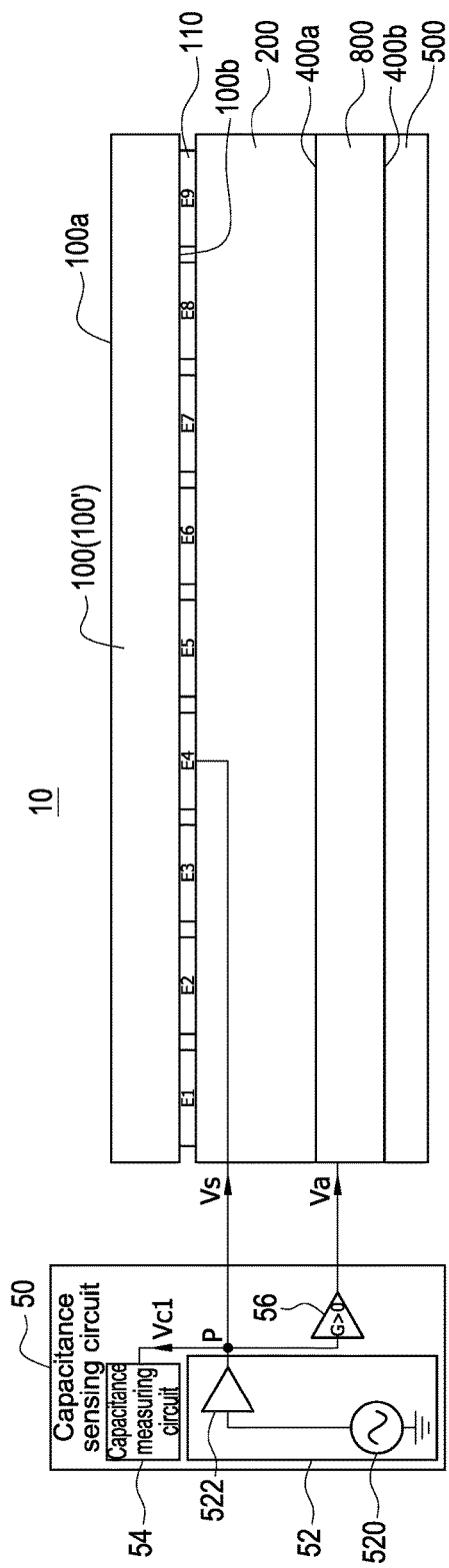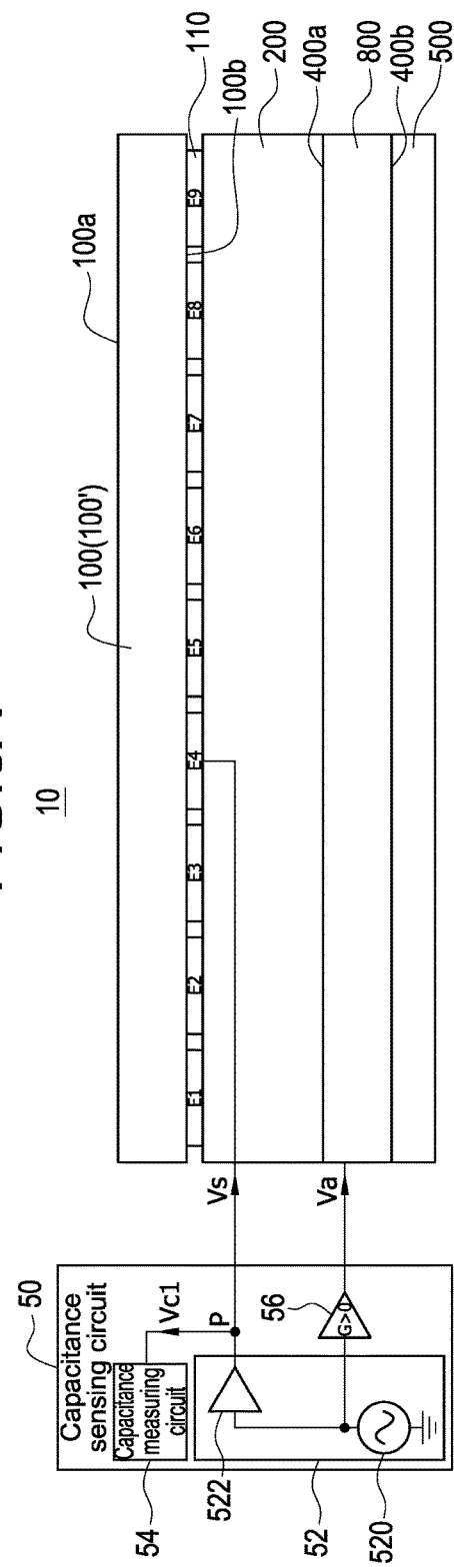

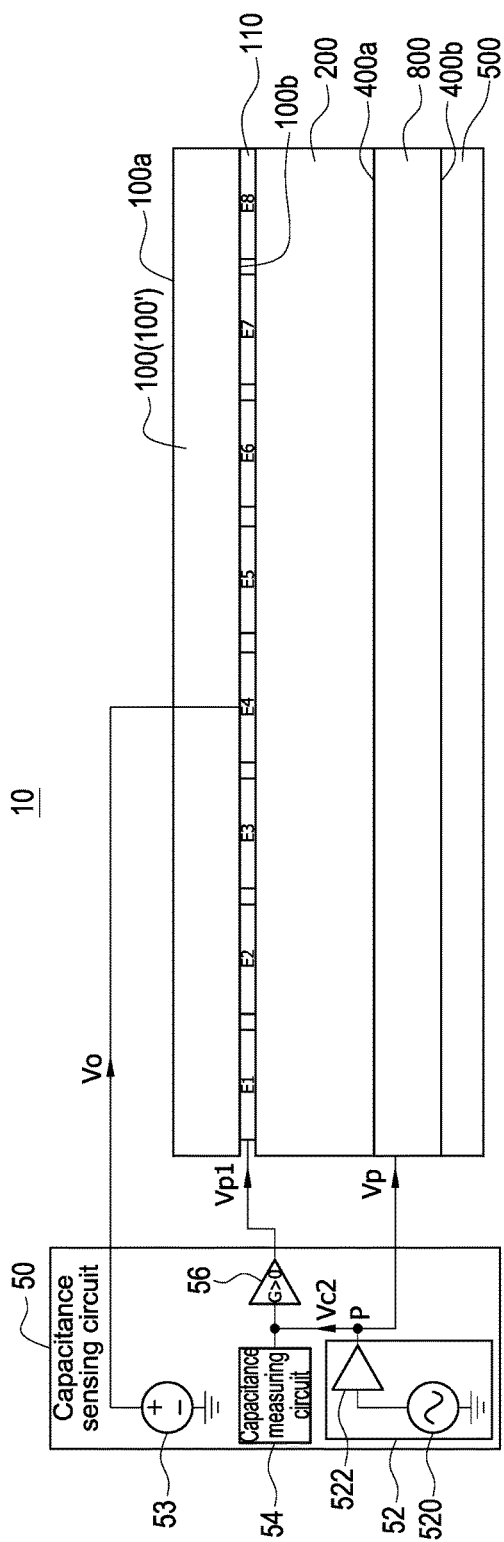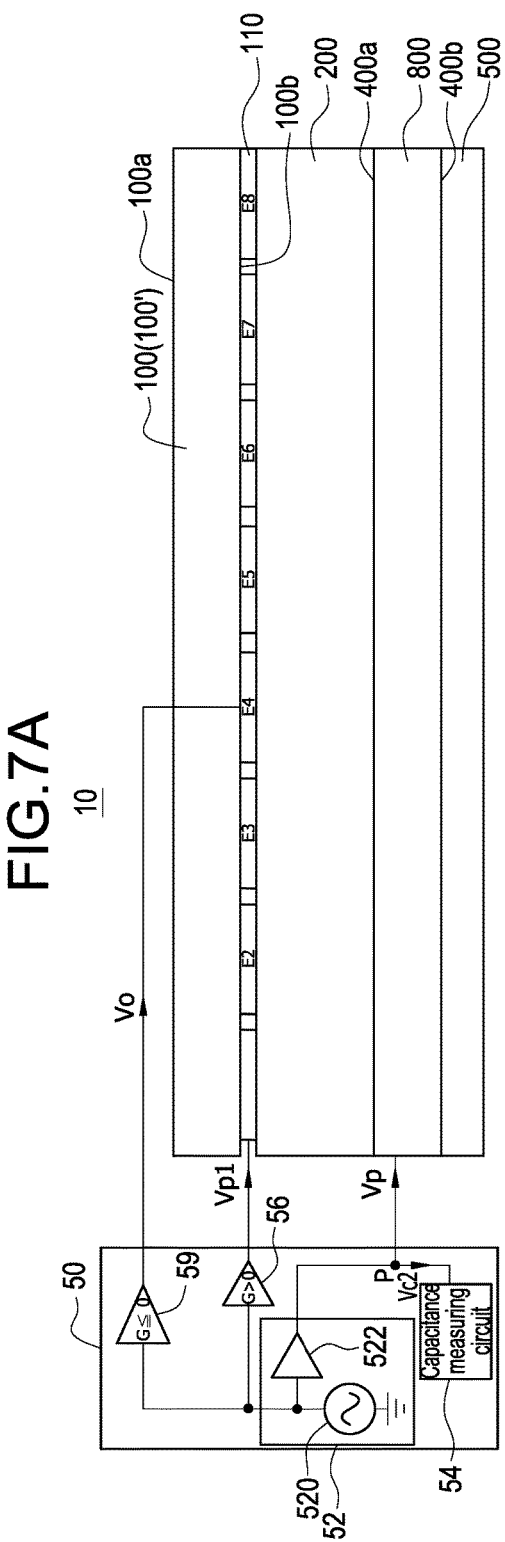

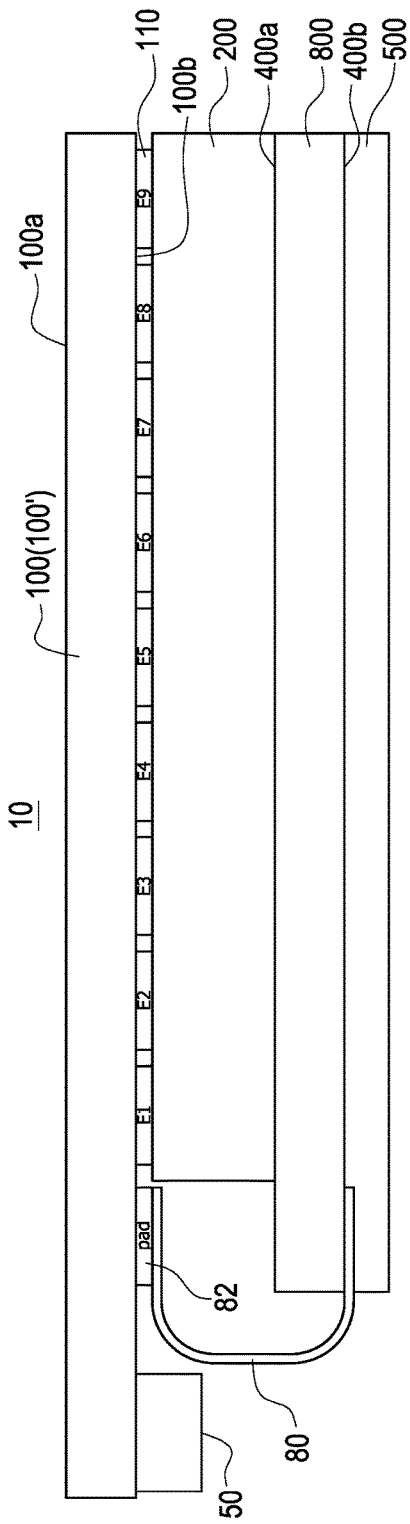
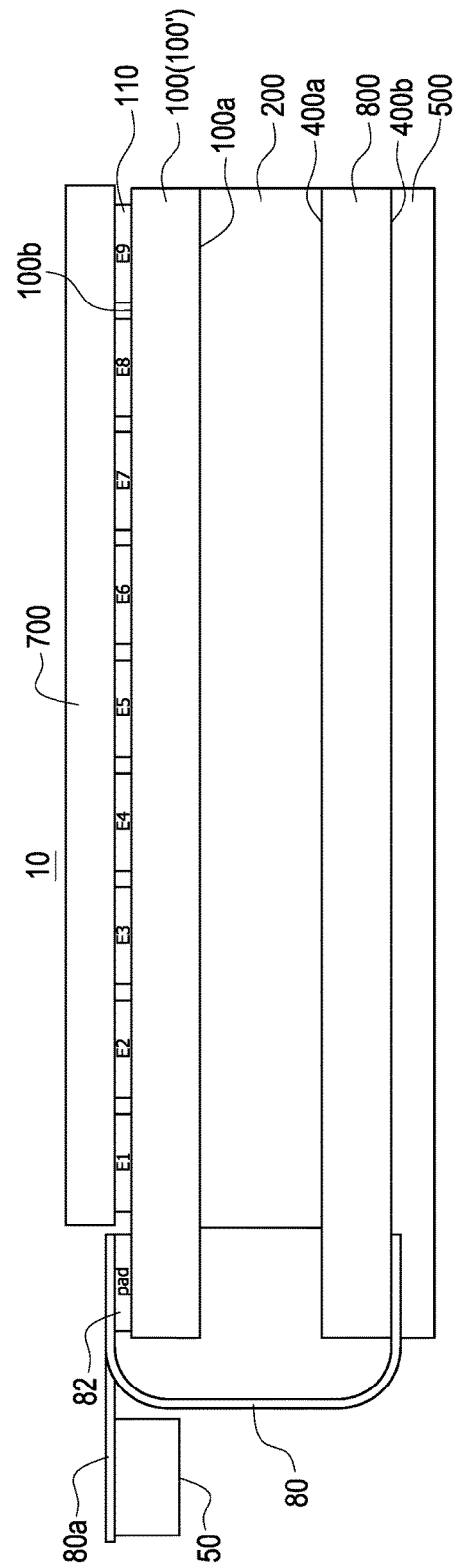
FIG.8A
FIG.8B

SENSING DEVICE FOR FORCE AND TACTILE-PROXIMITY SENSING

BACKGROUND OF THE INVENTION

Field of the Invention

The present invention relates to a sensing device, especially to a sensing device for force and tactile-proximity sensing.

Description of Prior Art

The touch display panels become popular as the market growing of the compact and lightweight mobile device. The pressure touch control technology has rapid development owing to the maturity of touch-control user interface and serious demand for 3D touch operation. Meanwhile, the broad application of robot in industry is gradually extending to office, hospital and family, and resulting in the rapid increase of need for human touch device. The conventional pressure touch control panel generally integrates microelectromechanical sensor at edge or corner of the display panel to sense tactile pressure on the display panel, or locates a plurality of force sensors of micro mechanic in artificial skin of robot for touch and force sensing. The cost of the sensor is high and the assembling of the sensor is difficult. Besides, artificial skin including conductive rubber, conductive sponge, or carbon fiber can detect the force and variation of resistance by measuring variation of current, but the power consuming is high and accuracy is not good, both of this artificial skin and the aforementioned one cannot sense the proximity of object, thus it still needs lots of effort to improve the pressure touch control panel and human tactile-proximity device.

SUMMARY OF THE INVENTION

It is an object to provide a sensing device for force and tactile-proximity sensing to overcome above-mentioned problems.

Accordingly, the present invention provides a sensing device for force and tactile-proximity sensing, the sensing device comprising: an upper substrate having a first face and a second face opposite to the first face; a lower substrate having a first face and a second face opposite to the first face; a resilient dielectric layer arranged between the upper substrate and the lower substrate parallel to the upper substrate, and the resilient dielectric layer being compressively deformed under pressure, and restoring to original shape and volume if pressure is not present; a first electrode layer arranged on a second face of the upper substrate and having a plurality of first sensing electrode; a second electrode layer arranged on a first face of the lower substrate, having second sensing electrodes with a predetermined number, wherein the predetermined number is smaller than a number of the first sensing electrode; and a capacitance sensing circuit configured to send a touch control capacitance-exciting signal to at least one selected first sensing electrode sequentially or randomly, and obtain a tactile-proximity sensing signal from the selected first sensing electrode, thus performing tactile-proximity sensing, and sending a tactile-proximity auxiliary signal with same phase as that of the touch control capacitance-exciting signal to at least one corresponding second sensing electrode; the capacitance sensing circuit sending a force capacitance-exciting signal to the at least one second sensing electrode and obtaining a force sensing signal from the second sensing electrode, thus performing force sensing; the capacitance sensing circuit sending a force counter-exciting signal to the selected first sensing electrode sequentially or randomly while performing force sensing.

It is another object to provide flexible device for tactile-proximity sensing to overcome above-mentioned problems.

Accordingly, the present invention provides a flexible device for tactile-proximity sensing, the device comprising: a flexible upper substrate having a first face and a second face opposite to the first face; a resilient dielectric layer having a first face and a second face opposite to the first face, the resilient dielectric layer being arranged on a side of the second face of the flexible upper substrate, the first face of the resilient dielectric layer facing the second face of the flexible upper substrate, the resilient dielectric layer being compressively deformed under pressure and restoring to original shape and volume if pressure is not present; a first electrode layer arranged on the second face or the first face of the flexible upper substrate, the first electrode layer having a plurality of first sensing electrode; a second electrode layer arranged on the second face of the resilient dielectric layer and having at least one second sensing electrode; and a capacitance sensing circuit, sending a capacitance-exciting signal to a selected first sensing electrode sequentially or randomly, and obtaining a tactile-proximity sensing signal from the first sensing electrode, thus performing tactile-proximity sensing, and sending a tactile-proximity auxiliary signal with phase same as that of the touch control capacitance-exciting signal to at least one corresponding second sensing electrode; the capacitance sensing circuit sending a force capacitance-exciting signal to the at least one corresponding second sensing electrode and obtaining a force sensing signal from the second sensing electrode, thus performing force sensing; the capacitance sensing circuit sending a force counter-exciting signal to the selected first sensing electrode sequentially or randomly while performing force sensing.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale. FIG. 1A shows a schematic view of the sensing device for force and tactile-proximity sensing according to an embodiment of the present invention.

FIG. 1B shows a schematic view of the sensing device for force and tactile-proximity sensing according to another embodiment of the present invention.

FIG. 4C shows a sectional view of the sensing device for force and tactile-proximity sensing according to another embodiment of the present invention.

FIG. 4D shows a sectional view of the sensing device for force and tactile-proximity sensing according to another embodiment of the present invention.

FIG. 5A shows a sectional view of the sensing device for force and tactile-proximity sensing according to another embodiment of the present invention.

FIG. 5B shows a sectional view of the sensing device for force and tactile-proximity sensing according to another embodiment of the present invention.

FIG. 6A shows the sensing device for force and tactile-proximity sensing according to another embodiment of the present invention.

FIG. 6B shows the sensing device for force and tactile-proximity sensing according to another embodiment of the present invention.

FIG. 7A shows the sensing device for force and tactile-proximity sensing according to another embodiment of the present invention.

FIG. 7B shows the sensing device for force and tactile-proximity sensing according to another embodiment of the present invention.

FIG. 8A shows a sectional view of the sensing device for force and tactile-proximity sensing according to another embodiment of the present invention.

FIG. 8B shows a sectional view of the sensing device for force and tactile-proximity sensing according to another embodiment of the present invention.

DETAILED DESCRIPTION OF THE INVENTION

Figure 2A:
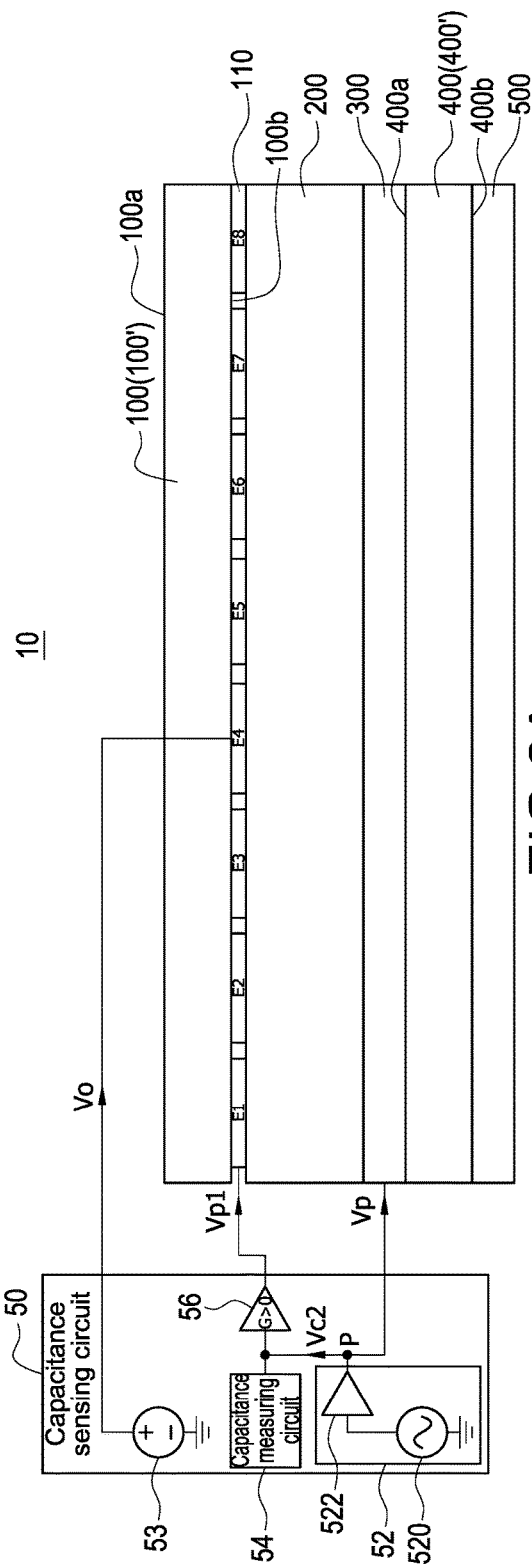
FIG. 2A shows a schematic view of the sensing device for force and tactile-proximity sensing according to another embodiment of the present invention.

FIG. 1A shows a schematic view of the sensing device for force and tactile-proximity sensing (hereinafter the sensing device) according to an embodiment of the present invention. The sensing device 10 is applied to display panel, remote controller, game device, keyboard, touch control pad etc., for performing force touch control inputting, also applied to robot, hospital equipment, rehabilitation device, prosthesis etc., for simulating tactile-proximity simulation inputting, and further applied to automatic clean or automatic handing device, to perform proximity sensing for anti-collision and anti-extrusion. The sensing device 10 includes, from top to bottom and based on the direction of user operation, an upper substrate 100, a resilient dielectric layer 200, a second electrode layer 300, a lower substrate 400 and an adhesive layer 500, wherein the upper substrate 100 has a first face 100a, a second face 100b opposite to the first face and a first electrode layer 110 on the second face 100b. The first electrode layer 110 has a plurality of first sensing electrodes, such as the first sensing electrodes E1-E9 shown in FIG. 1A, however the number and the arrangement of the first sensing electrodes is not limited here. The lower substrate 400 has a first face 400a, a second face 400b opposite to the first face and the second electrode layer 300 on the first face 400a, the second electrode layer 300 has a predetermined number of second sensing electrodes 310, wherein the predetermined number is far less than that of the first sensing electrode. For example, the predetermined number is one, or below a predetermined proportion (such as 1/10) of the number of the first sensing electrodes. In other words, because a self-capacitance sensing circuit 50 can be used in the present invention, thus the number of the second sensing electrode 310 can be much smaller than that of the first sensing electrode. In a preferred embodiment, the number of the second sensing electrode 310 is 1. The sensing device 10 further includes a capacitance sensing circuit 50; the capacitance sensing circuit 50 includes a capacitance-excitation driving circuit 52 and a capacitance measuring circuit 54. Besides, the adhesive layer 500 is arranged on a face of the lower substrate 400; the face is opposite to the upper substrate 100. Furthermore, tactile-proximity sensing in the present invention includes touch control sensing (touch sensing) of a user finger actually in contact with the upper substrate 100 and proximity sensing of a user finger getting close to the upper substrate 100. When the user finger is actually in contact with the sensing device 10 or gets close to the sensing device 10, a relative capacitance of the first sensing electrodes in the sensing device 10 is affected, thus sensing the capacitance can tell whether the finger is in contact with or getting close to the sensing device 10. In the following description, tactile-proximity sensing described includes touch control sensing and proximity sensing.

Please refer to FIG. 1A again, for describing the operation of tactile-proximity sensing of the sensing device 10 in the present invention. The capacitance exciting driving circuit 52 includes a signal source 520 and a driving unit 522, and sequentially or randomly sends a touch control capacitance-exciting signal (stimulus signal) Vs to a selected first sensing electrode (for example, the first sensing electrode E4). The capacitance exciting driving circuit 52 sends the touch control capacitance-exciting signal Vs to an non-inverting amplifier 56, a gain of the in-phase amplifier 56 is preferred to be 1 to generate a tactile-proximity auxiliary signal Va with phase same as that of the touch control capacitance-exciting signal Vs, while the tactile-proximity auxiliary signal Va is sent to at least one corresponding second sensing electrode 310. Because the signal with phase same as that of touch control capacitance-exciting signal Vs is sent to the corresponding second sensing electrode 310, there is only minute (or even no) voltage difference between the corresponding selected first sensing electrode E4 and the corresponding second sensing electrode 310 equivalently. Besides, after the capacitance exciting driving circuit 52 of the capacitance sensing circuit 50 sends the touch control capacitance-exciting signal Vs to the selected first sensing electrode E4, the capacitance reading circuit 54 of the capacitance sensing circuit 50 can read tactile-proximity sensing signal Vc1 at sensing point P, that is, the position of tactile-proximity can be determined in accuracy, which determines whether the user finger (touch control pen or other object) is in contact with or gets close to the corresponding first sensing electrode E4.

Please refer to FIG. 1B, FIG. 1B shows a schematic view of the sensing device 10 according to another embodiment of the present invention. The embodiment shown in FIG. 1B is similar to that shown in FIG. 1A, however the capacitance exciting driving circuit 52 directly sends the signal source 520 to the non-inverting amplifier 56 (not passing driver 522) in this embodiment, the gain of the in-phase amplifier 56 is preferred to be 1 to generate a tactile-proximity auxiliary signal Va with same phase as the touch control capacitance-exciting signal Vs, the tactile-proximity auxiliary signal Va can be used to decrease or eliminate the effect of warp or deformation of the resilient dielectric layer 200. After the capacitance exciting driving circuit 52 of the capacitance sensing circuit 50 sends the touch control capacitance-exciting signal Vs to the selected tactile-proximity sensing electrode E4, the capacitance reading circuit 54 of the capacitance sensing circuit 50 can read the tactile-proximity sensing signal Vc1 at the sensing point P, that is, the position of touch control can be determined in accuracy.

Furthermore, according to an embodiment of the present invention, the upper substrate 100 and the lower substrate 400 are polymer thin films or ultra-thin glass, thickness of the upper substrate 100 or the lower substrate 400 is not more than 200 μm to form a thin-film-based sensing device. Besides, according to another embodiment of the present invention, the upper substrate 100 and the lower substrate 400 are flexible substrates with thickness no more than 200 μm to form a thin-film-based sensing device.

Furthermore, according to another embodiment of the present invention, the upper substrate is a flexible upper substrate 100' and the lower substrate is a flexible lower substrate 400' to form a flexible sensing device, wherein the flexible lower substrate 400' is a polymer thin film, ultra-thin glass not thicker than 200 μm, or a metal foil substrate. The flexible upper substrate 100' is a polymer thin film or ultra-thin glass not thicker than 100 μm.

FIG. 2A shows a schematic view of the sensing device 10 according to another embodiment of the present invention. The force sensing is performed to the second sensing electrode opposite to the selected first sensing electrode E4 after tactile-proximity sensing is performed to the selected first sensing electrode E4. Please also refer to FIG. 9, the second sensing electrode opposite to the selected first sensing electrode E4 is a second sensing electrode 310a, thus as shown in FIG. 2A, a force capacitance-exciting signal Vp for force sensing is sent to the second sensing electrode 310a. The capacitance sensing circuit 50 of the sensing device 10 has a non-inverting amplifier 56, a gain of the non-inverting amplifier 56 is preferred to be 1, for amplifying the force capacitance-exciting signal Vp in-phase to generate a shielding signal Vp1, the shielding signal Vp1 is sent to non-selected first sensing electrodes E1-E3, E5-E9 and En (shown in FIG. 9), that is, at least part of other first sensing electrodes except for the selected first sensing electrode E4. Furthermore, the capacitance sensing circuit 50 of the sensing device 10 has a dc reference signal source 53 capable of generating a force counter-exciting signal Vo sent to the selected first sensing electrode E4, the force counter-exciting signal Vo can be sent sequentially or randomly.

Please refer to FIG. 2A again, while performing force sensing, the shielding signal Vp1 with phase same as that of the capacitance-exciting signal Vp is sent to the non-selected first sensing electrode, that is, at least part of first sensing electrodes except for the selected first sensing electrode E4, thus shielding the capacitance variation from finger operation and increasing the force sensing accuracy. Furthermore, a force counter-exciting signal Vo with a predetermined voltage level is sent to the selected first sensing electrode E4 to enhance a sensitivity of the force sensing of the corresponding second sensing electrode. The capacitance reading circuit 54 of capacitance sensing circuit 50 can read a force sensing signal Vc2 from the second sensing electrode, for example, the second sensing electrode 310a at the sensing point P, thus determining a touch event being present or not and the value of the force at the first sensing electrode E4.

Figure 2B:
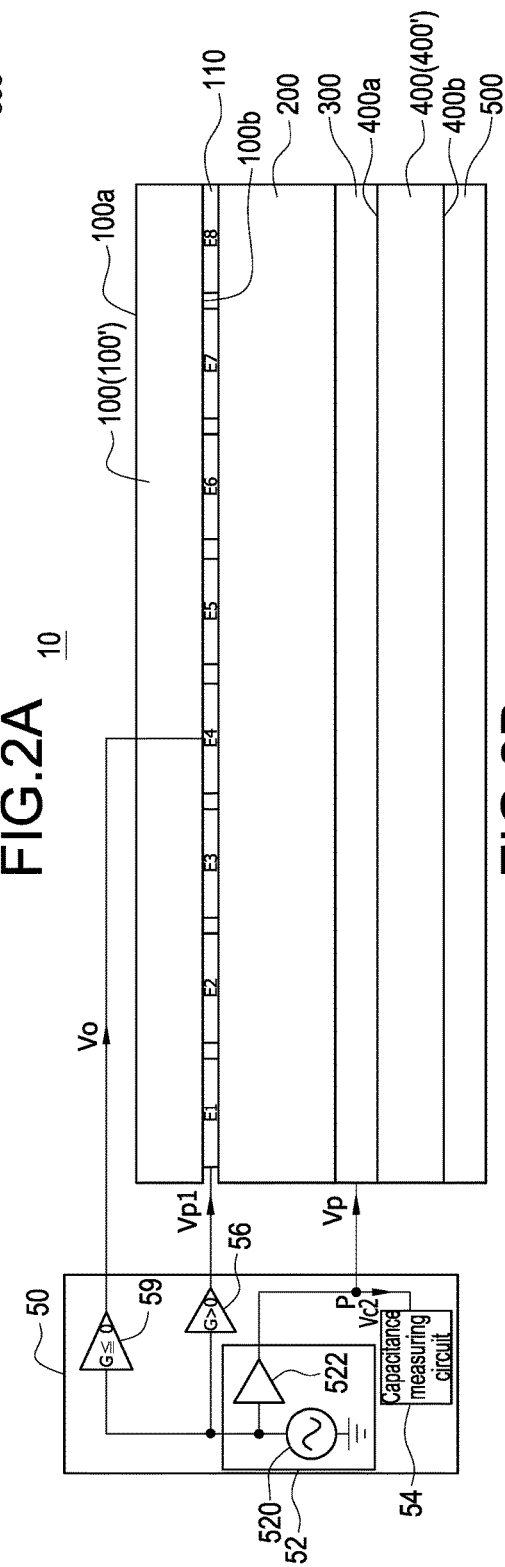
FIG. 2B shows a schematic view of the sensing device for force and tactile-proximity sensing according to another embodiment of the present invention.

FIG. 2B shows a schematic view of the sensing device 10 according to another embodiment of the present invention, and the sensing device 10 is used for operation of force sensing. The sensing device 10 is similar to the embodiment shown in FIG. 2A. However, the capacitance sensing circuit 50 has an inverting amplifier 59 to replace the dc reference signal source 53. In other words, the sensing device 10 in the embodiment uses the inverting amplifier 59 to generate a time varying signal with phase opposite to that of the force capacitance-exciting signal Vp, to be used as the force counter-exciting signal Vo. Similarly, the sensitivity and accuracy of the force sensing of the second sensing electrode can be enhanced.

Figure 3A:
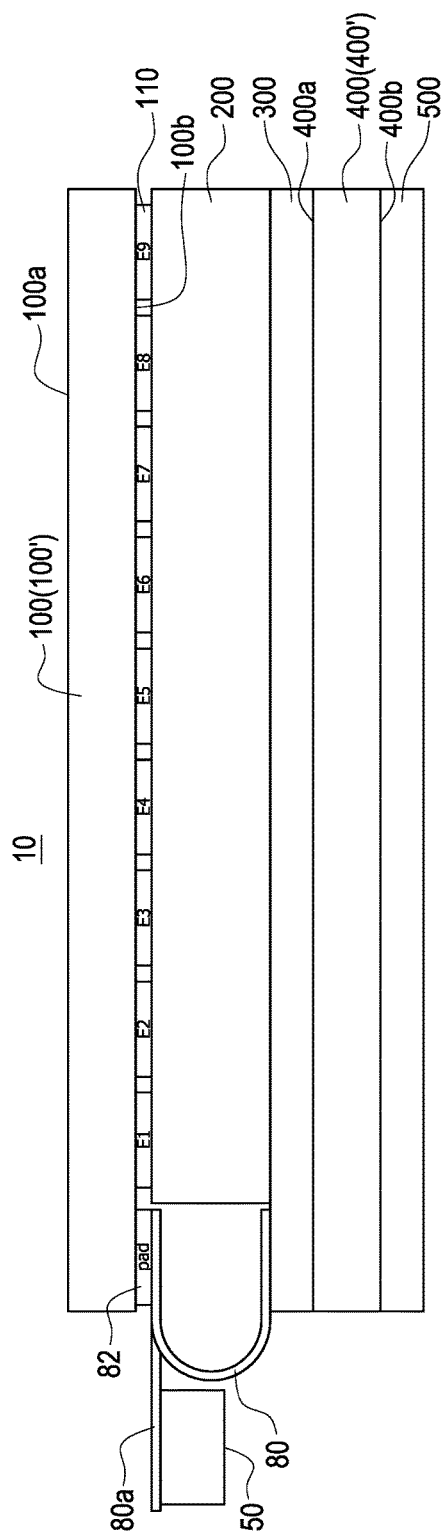
FIG. 3A shows a sectional view of the sensing device for force and tactile-proximity sensing according to an embodiment of the present invention.

FIG. 3A shows a sectional view of the sensing device according to an embodiment of the present invention, the sensing device 10 is similar to the embodiment shown in FIG. 1A, the sensing device 10 further includes a plurality of conductive pads 82 and a flexible circuit board 80, the conductive pad 82 is arranged on the second face 100b of the upper substrate 100, wherein the flexible circuit board 80 has a first face 80a, the flexible circuit board 80 is arranged between the second electrode layer 300 and the conductive pad 82 of the upper substrate 100. Besides, the flexible circuit board 80, after being curled, protrudes to a position near the first electrode layer 110 at one terminal, and the capacitance sensing circuit 50 is arranged on the first face 80a at the protruding terminal of the flexible circuit board 80.

Figure 3B:
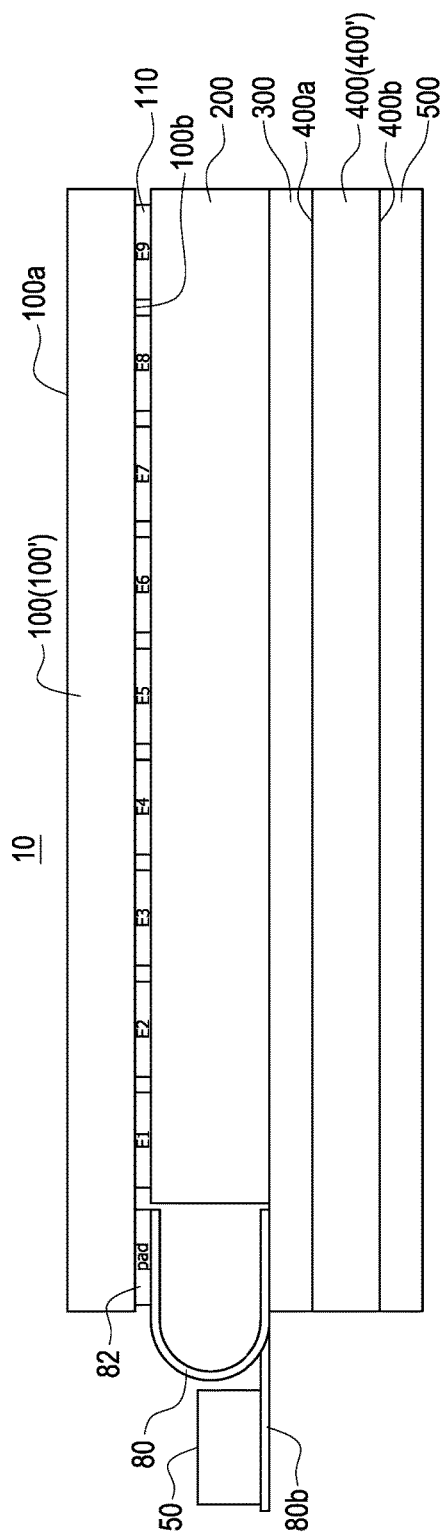
FIG. 3B shows a sectional view of the sensing device for force and tactile-proximity sensing according to another embodiment of the present invention.

FIG. 3B shows a sectional view of the sensing device 10 according to another embodiment of the present invention, the sensing device is similar to the embodiment shown in FIG. 3A. However, the flexible circuit board 80, after being curled, protrudes to a position near the second electrode layer 300 at one terminal in the embodiment, and the capacitance sensing circuit 50 is arranged on the second face 80b at the protruding terminal of the flexible circuit board 80.

FIGS. 4A-4D show sectional views of the sensing device 10 according to other embodiments of the present invention. Please refer to FIG. 4A, the sensing device 10 is similar to the embodiment shown in FIG. 3A, wherein the capacitance sensing circuit 50 of the sensing device 10 is arranged on the second face 100b of the upper substrate 100. Please refer to FIG. 4B, the sensing device 10 is similar to the embodiment shown in FIG. 4A, wherein the capacitance sensing circuit 50 of the sensing device 10 is arranged on the first face 400a of the lower substrate 400. Please refer to FIG. 4C, the sensing device 10 is similar to the embodiment shown in FIG. 3A, wherein the flexible circuit board 80 is replaced by a conductive pillar 600, and the capacitance sensing circuit 50 is arranged on the second face 100b of the upper substrate 100. The sensing device 10 further includes a conductive pad 84, the conductive pad 84 electrically connects to the conductive pillar 600 and the second electrode layer 300; the conductive pillar 600 can be formed with an anisotropic conductive film (ACF) or metal material. Please refer to FIG. 4D, the sensing device 10 is similar to the embodiment shown in FIG. 4C, the capacitance sensing circuit 50 of the sensing device 10 is arranged on the first face 400a of the lower substrate 400.

Figure 4A:
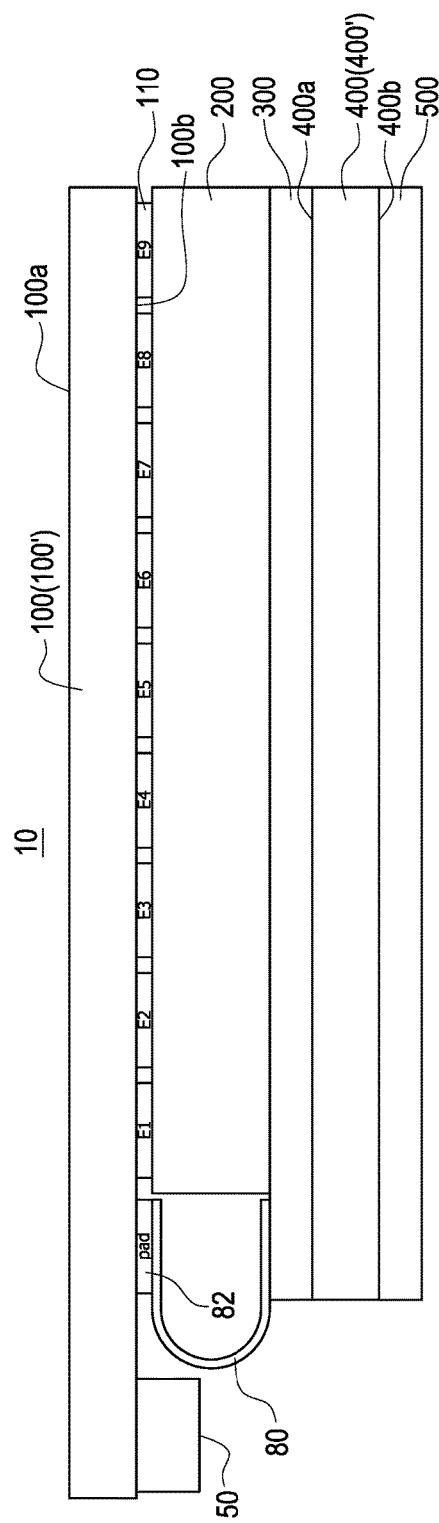
FIG. 4A shows a sectional view of the sensing device for force and tactile-proximity sensing according to another embodiment of the present invention.

FIG. 5A shows a sectional view of the sensing device 10 according to another embodiment of the present invention, the sensing device 10 is similar to the embodiment shown in FIG. 4A, but the second electrode layer 300 and lower substrate 400 exchange the position with each other. Similarly, the flexible circuit board 80 is arranged between the second electrode layer 300 and the conductive pad 82 of the upper substrate 100. Besides, the capacitance sensing circuit 50 is arranged on the second face 100b of the upper substrate 100.

Figure 4B:
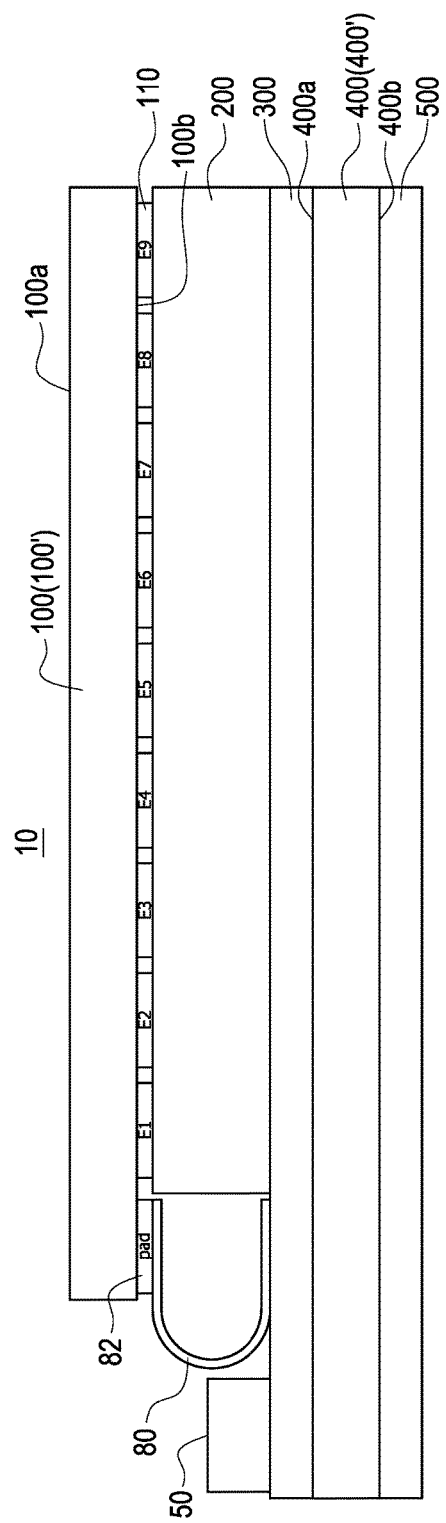
FIG. 4B shows a sectional view of the sensing device for force and tactile-proximity sensing according to another embodiment of the present invention.

FIG. 5B shows a sectional view of the sensing device 10 according to another embodiment of the present invention, the sensing device 10 is similar to the embodiment shown in FIG. 4B, but the upper substrate 100 is upside down, making the second face 100b of the upper substrate 100 face up, and the sensing device 10 further includes a protection layer 700, the protection layer 700 covers the first electrode layer 110 of the upper substrate 100. Similarly, the flexible circuit board 80 is arranged between the second electrode layer 300 and the conductive pad 82 of the upper substrate 100. Besides, the capacitance sensing circuit 50 is arranged on the first face 400a of the lower substrate 400.

FIG. 6A shows the sensing device 10 according to another embodiment of the present invention, and the sensing device 10 is also used for operation of tactile-proximity sensing, the sensing device 10 shown in FIG. 6A is similar to the embodiment shown in FIG. 1A, but the sensing device 10 has a metal foil substrate 800 to replace the lower substrate 400 and the second electrode layer 300.

FIG. 6B shows the sensing device 10 according to another embodiment of the present invention, and the sensing device 10 is also used for operation of tactile-proximity sensing, the sensing device 10 shown in FIG. 6B is similar to the embodiment shown in FIG. 1B, but the sensing device 10 has a metal foil substrate 800 to replace the lower substrate 400 and the second electrode layer 300.

FIG. 7A shows the sensing device 10 according to another embodiment of the present invention, and the sensing device 10 is also used for operation of force sensing, the sensing device 10 shown in FIG. 7A is similar to the embodiment shown in FIG. 2A, but the sensing device 10 has a metal foil substrate 800 to replace the lower substrate 400 and the second electrode layer 300.

FIG. 7B shows the sensing device 10 according to another embodiment of the present invention, and the sensing device 10 is also used for operation of force sensing, the sensing device 10 shown in FIG. 7B is similar to the embodiment shown in FIG. 2B, but the sensing device 10 has a metal foil substrate 800 to replace the lower substrate 400 and the second electrode layer 300.

FIG. 8A shows a sectional view of the sensing device 10 according to another embodiment of the present invention, the sensing device 10 shown in FIG. 8A is similar to the embodiment shown in FIG. 5A, but the sensing device 10 has a metal foil substrate 800 to replace the lower substrate 400 and the second electrode layer 300.

FIG. 8B shows a sectional view of the sensing device 10 according to another embodiment of the present invention, the sensing device 10 shown in FIG. 8B is similar to the embodiment shown in FIG. 5B, but the sensing device 10 has a metal foil substrate 800 to replace the lower substrate 400 and the second electrode layer 300. Besides, the flexible circuit board 80, after being rolled, has a protruded end extended to a position near the protection layer 700, and the capacitance sensing circuit 50 is arranged on the first face 80a at the protruded end of the flexible circuit board 80.

In the above embodiments, the upper substrate 100 and the lower substrate 400 are, for example, polymer thin films or ultra-thin glass, each of the upper substrate 100 and the lower substrate 400 is not thicker than 200 um, the resilient dielectric layer 200 is arranged between the upper substrate 100 and the lower substrate 400, the upper substrate 100 and the lower substrate 400 are parallel to each other. The resilient dielectric layer 200 is compressively deformed under pressure, and restoring to original shape and volume if pressure is not present. The touch control capacitance-exciting signal (first capacitance-exciting signal) Vs and the force capacitance-exciting signal (second capacitance-exciting signal) Vp are time varying signals, such as a sinusoidal wave signal, a square wave signal, a triangular wave signal or a trapezoidal wave signal. The touch control capacitance-exciting signal Vs and the force capacitance-exciting signal Vp can also be current sources. The force counter-exciting signal Vo is a dc reference signal or a time varying signal with phase opposite to that of the force capacitance-exciting signal Vp. The capacitance sensing circuit 50 is a self-capacitance sensing circuit. The first sensing electrode and second sensing electrode are made of transparent conductive material, such as indium tin oxide or indium zinc oxide. In other embodiment, the first sensing electrode and second sensing electrode are made of non-transparent conductive material, such as graphite, gold, silver, copper, aluminum, tin, indium, tungsten and molybdenum, or alloy of above metals.

Figure 9:
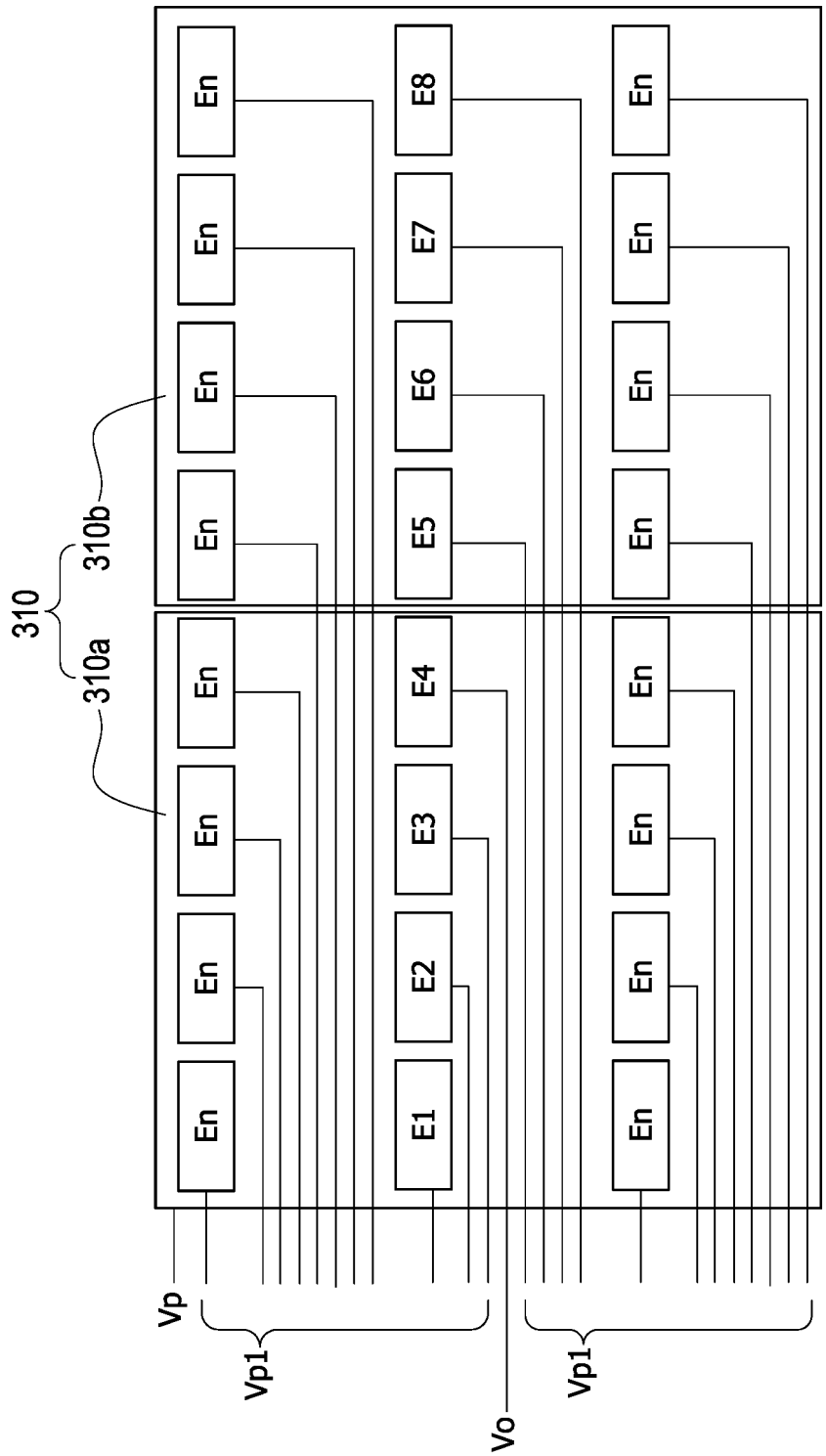
FIG. 9 shows a partial top view of the sensing device for force and tactile-proximity sensing according to an embodiment of the present invention.

FIG. 9 shows a partial top view of the sensing device 10 according to an embodiment of the present invention, mainly illustrating the arrangement of the second sensing electrode 310 and the first sensing electrodes E1-E8, En. As shown in this figure, the second electrode layer 300 includes two second sensing electrode 310a, 310b, and each of the first sensing electrodes E1-E8, En corresponds to at least one second sensing electrode 310a or 310b. The correspondence means that, from projection view, each of the first sensing electrodes E1-E8, En partially overlaps with at least one second sensing electrode 310, or is near at least one second sensing electrode 310. For example, for the selected first sensing electrode E4 mentioned above, the corresponding second sensing electrode is the second sensing electrode 310a. If an area of the first sensing electrode is larger than that of the second sensing electrode, then each of the first sensing electrodes can correspond to a plurality of second sensing electrodes. The examples above are only for explaining an embodiment of the present invention, not for limiting the present invention.

Figure 10:
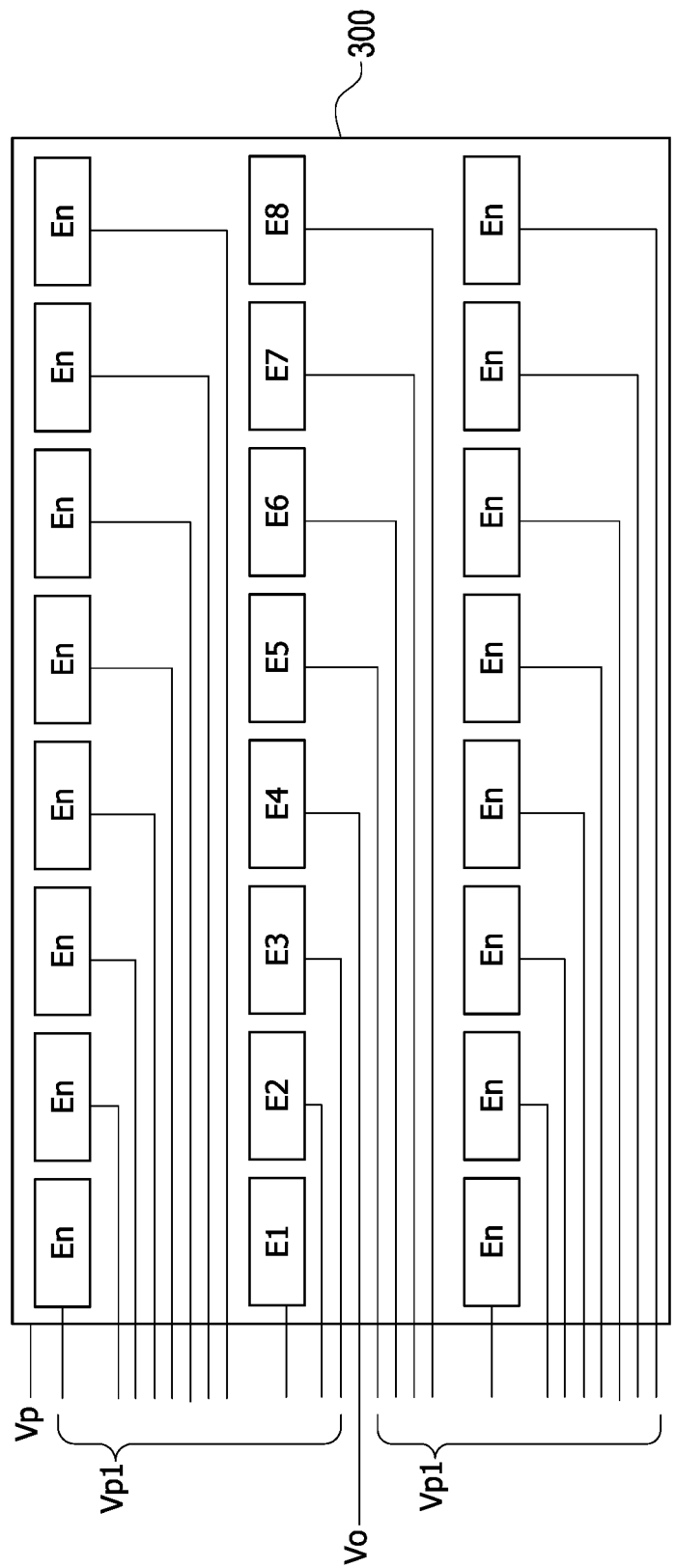
FIG. 10 shows a partial top view of the sensing device for force and tactile-proximity sensing according to an embodiment of the present invention.

FIG. 10 shows a partial top view of the sensing device 10 according to an embodiment of the present invention, mainly illustrating the arrangement of the second sensing electrode 310 and the first sensing electrodes E1-E8, En, and the signals sending corresponding to the force capacitance-exciting signal Vp, the shielding signal Vp1, and the force counter-exciting signal Vo signal for force sensing.

Figure 11:
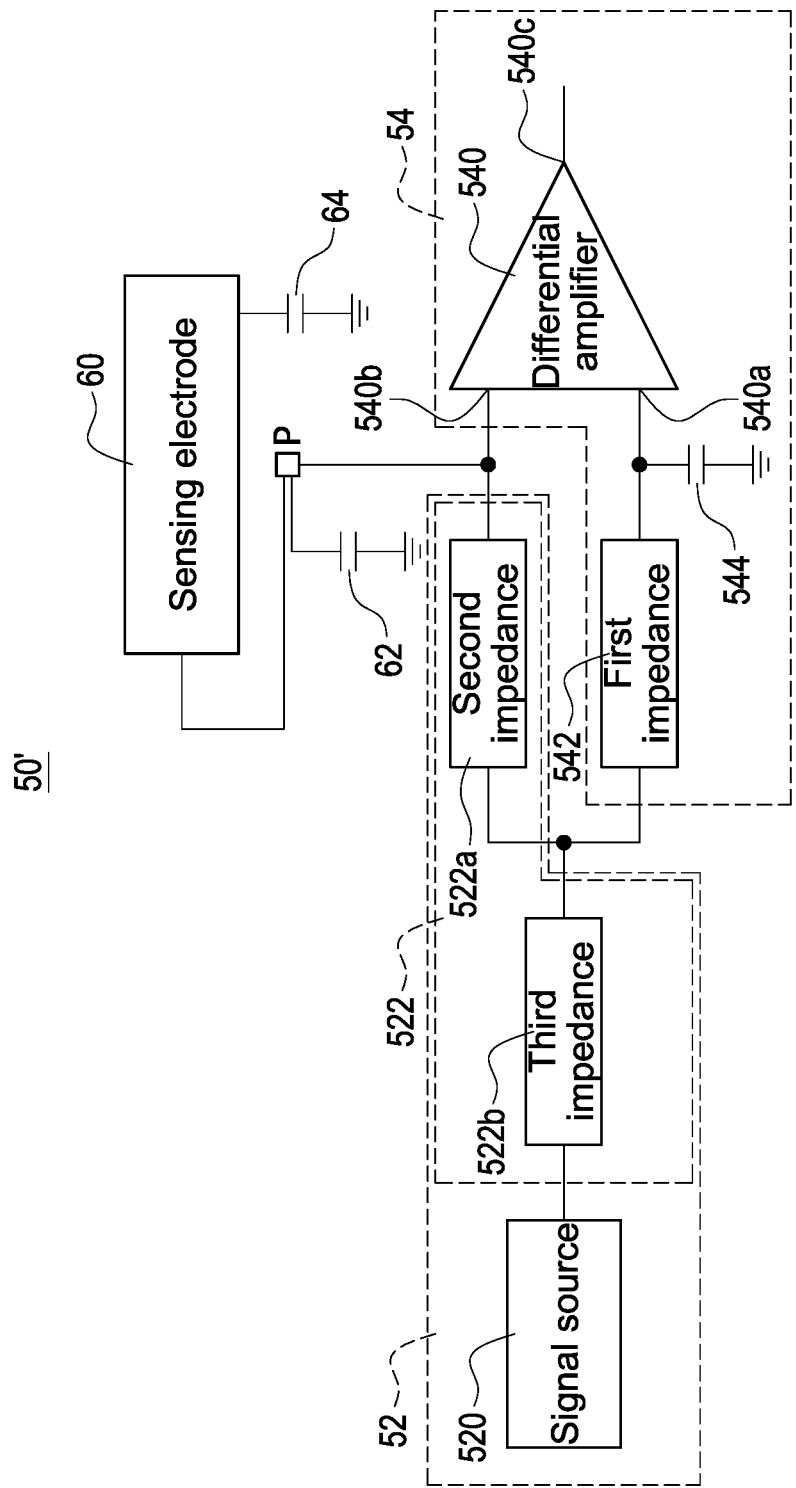
FIG. 11 shows a schematic view of the self-capacitance sensing circuit according to an embodiment of the present invention.

FIG. 11 shows the circuit diagram of the self-capacitance sensing circuit 50' according to an embodiment of the present invention. The self-capacitance sensing circuit 50' mainly comprises a capacitance-excitation driving circuit 52 and a capacitance measuring circuit 54 to sense a capacitance change at the sensing point P. The capacitance-excitation driving circuit 52 comprises a signal source 520 and a driving unit 522 (including a second impedance 522a and a third impedance 522b). The capacitance measuring circuit 54 comprises a differential amplifier 540, a first impedance 542 and a first capacitor 544 and is used to sense a capacitance change at a sensing electrode 60, where the sensing electrode 60 comprises a first stray capacitance 62 and a second stray capacitance 64.

The signal source 520 is electrically coupled with the first impedance 542 and the second impedance 522a. The first impedance 542 is electrically coupled with the first capacitor 544 and the first capacitor 544 is electrically coupled with the first input end 540a of the differential amplifier 540. The second impedance 522a is electrically coupled with the second input end 540b of the differential amplifier 540. The sensing electrode 60 is electrically coupled to the second impedance 522a and the second input end 540b through a node (such as an IC pin) of the self-capacitance sensing circuit 50'. The first stray capacitance 62 is electrically coupled to the node and the second stray capacitance 64 is electrically coupled to the sensing electrode 60.

In the self-capacitance sensing circuit 50' shown in FIG. 11, the sensing electrode 60 receives a touch signal when a finger or a conductor is touched thereon. The signal source 520 is a periodical signal and sent to the third impedance 522, while the resistance values of the first impedance 542 and the second impedance 522a are identical. The differential amplifier 540 will generate a differential touch signal after receiving the signal source 520 and the touch signal from the sensing electrode 60. In this embodiment, the capacitance of the first capacitor 544 is equal to the resulting capacitance of the first stray capacitance 62 in parallel connection with the second stray capacitance 64. The capacitance of the second stray capacitance 64 changes when user finger approaches or touches the sensing electrode 60. Therefore, the voltages fed to the first input end 540a and the second input end 540b will be different such that the differential amplifier 540 has a (non-zero) differential output at the output end 540c. In this way, the minute capacitance change on the sensing electrode 60 can be detected by the differential amplifier 540. Moreover, the noise from circuits or power source can be advantageously removed. The detail of the self-capacitance sensing circuit 50' can be referred to U.S. Pat. No. 8,704,539 (corresponding to Taiwan patent No. I473001) filed by the same applicant.

Thus, particular embodiments have been described. Other embodiments are within the scope of the following claims. For example, the actions recited in the claims may be performed in a different order and still achieve desirable results.

What is claimed is:

1. A sensing device for force and tactile-proximity sensing, the sensing device comprising:
   an upper substrate having a first face and a second face opposite to the first face;
   a lower substrate having a first face and a second face opposite to the first face;
   a resilient dielectric layer arranged between the upper substrate and the lower substrate parallel to the upper substrate, the resilient dielectric layer being compressively deformed under pressure, and restoring to original shape and volume if pressure is not present;
   a first electrode layer arranged on the second face of the upper substrate and having a plurality of first sensing electrodes;
   a second electrode layer arranged on the first face of the lower substrate, having a plurality of second sensing electrodes, wherein a number of the second sensing electrodes is smaller than a number of the first sensing electrodes; and
   a capacitance sensing circuit configured to send a touch control capacitance-exciting signal to at least one selected first sensing electrode sequentially or randomly, and obtain a tactile-proximity sensing signal from the selected first sensing electrode, thus performing tactile-proximity sensing, and the capacitance sensing circuit configured to send a tactile-proximity auxiliary signal with same phase as that of the touch control capacitance-exciting signal to at least one corresponding second sensing electrode when performing the tactile-proximity sensing for the selected first sensing electrode; the capacitance sensing circuit configured to send a force capacitance-exciting signal to the at least one corresponding second sensing electrode and obtain a force sensing signal from the corresponding second sensing electrode, thus performing force sensing; the capacitance sensing circuit configured to send a force counter-exciting signal to the selected first sensing electrode sequentially or randomly while performing the force sensing,
   wherein the second sensing electrode corresponding to the selected first sensing electrode at least partially overlaps with the selected first sensing electrode from projection view.

2. The sensing device in claim 1, wherein the upper substrate and the lower substrate are polymer thin film or ultra-thin glass, a thickness of the upper substrate or the lower substrate is not more than 200 μm.

3. The sensing device for force and tactile-proximity sensing in claim 1, wherein the upper substrate and the lower substrate are flexible substrates with a thickness no more than 200 μm.

4. The sensing device for force and tactile-proximity sensing in claim 1, further comprising an adhesive layer arranged on a face of the lower substrate, the face being opposite to the upper substrate.

5. The sensing device for force and tactile-proximity sensing in claim 1, wherein the first sensing electrodes and the second sensing electrodes are made of transparent conductive material.

6. The sensing device for force and tactile-proximity sensing in claim 1, wherein the first sensing electrodes and the second sensing electrodes are made of non-transparent conductive material.

7. The sensing device for force and tactile-proximity sensing in claim 1, wherein the capacitance sensing circuit is self-capacitance sensing circuit.

8. The sensing device for force and tactile-proximity sensing in claim 1, wherein the capacitance sensing circuit further sends a tactile-proximity auxiliary signal with same phase as that of the touch control capacitance-exciting signal to the first sensing electrodes around the selected first sensing electrode while performing tactile-proximity sensing.

9. The sensing device for force and tactile-proximity sensing in claim 1, wherein the capacitance sensing circuit further sends a shielding signal with same phase as that of the force capacitance-exciting signal to the non-selected first sensing electrode while performing force sensing.

10. The sensing device for force and tactile-proximity sensing in claim 1, wherein the touch control capacitance-exciting signal and the force capacitance-exciting signal are time varying signals or current sources.

11. The sensing device for force and tactile-proximity sensing in claim 10, wherein the force counter-exciting signal is a dc reference signal or a time varying signal with phase opposite to that of the force capacitance-exciting signal.

12. The sensing device for force and tactile-proximity sensing in claim 11, wherein the dc reference signal is a zero volt signal.

13. The sensing device for force and tactile-proximity sensing in claim 1, wherein the predetermined number is 1 or below a predetermined proportion of the number of the first sensing electrodes.

14. The sensing device for force and tactile-proximity sensing in claim 13, wherein the predetermined proportion is 1/10.

15. A sensing device for tactile-proximity sensing, the device comprising:
- a flexible upper substrate having a first face and a second face opposite to the first face;
- a resilient dielectric layer having a first face and a second face opposite to the first face, the resilient dielectric layer being arranged on a side of the second face of the flexible upper substrate, the first face of the resilient dielectric layer facing the second face of the flexible upper substrate, the resilient dielectric layer being compressively deformed under pressure and restoring to original shape and volume if the pressure is not present;
- a first electrode layer arranged on the second face or the first face of the flexible upper substrate, the first electrode layer having a plurality of first sensing electrodes;
- a second electrode layer arranged on the second face of the resilient dielectric layer and having a plurality of second sensing electrodes; and
- a capacitance sensing circuit, sending a touch control capacitance-exciting signal to a selected first sensing electrode sequentially or randomly, and obtaining a tactile-proximity sensing signal from the selected first sensing electrode, thus performing tactile-proximity sensing, and sending a tactile-proximity auxiliary signal with phase same as that of the touch control capacitance-exciting signal to at least one corresponding second sensing electrode when performing the tactile-proximity sensing for the selected first sensing electrode; the capacitance sensing circuit sending a force capacitance-exciting signal to the at least one corresponding second sensing electrode and obtaining a force sensing signal from the at least one corresponding second sensing electrode, thus performing force sensing; the capacitance sensing circuit sending a force counter-exciting signal to the selected first sensing electrode sequentially or randomly while performing the force sensing;

wherein the second sensing electrode corresponding to the selected first sensing electrode at least partially overlaps with the selected first sensing electrode from projection view.

16. The sensing device for tactile-proximity sensing in claim 15, further comprising a flexible lower substrate, wherein the flexible lower substrate is a polymer thin film, ultra-thin glass with thickness no more than 200 μm, or metal foil substrate.

17. The sensing device for tactile-proximity sensing in claim 16, further comprising an adhesive layer arranged on a face of the flexible lower substrate, the face being opposite to the flexible upper substrate.

18. The sensing device for tactile-proximity sensing in claim 15, the flexible upper substrate is a polymer thin film, or ultra-thin glass with thickness smaller than 50 μm.

19. The sensing device for tactile-proximity sensing in claim 15, further comprising an adhesive layer arranged on a face of the second electrode layer, the face being opposite to the flexible upper substrate.

20. The sensing device for tactile-proximity sensing in claim 15, wherein the first sensing electrodes and the second sensing electrodes are made of transparent conductive material.

21. The sensing device for tactile-proximity sensing in claim 15, wherein the first sensing electrodes and the second sensing electrodes are made of non-transparent conductive material.

22. The sensing device for tactile-proximity sensing in claim 15, wherein the capacitance sensing circuit is a self-capacitance sensing circuit.

23. The sensing device for tactile-proximity sensing in claim 15, wherein the capacitance sensing circuit further sends a tactile-proximity auxiliary signal with same phase as that of the touch control capacitance-exciting signal to the first sensing electrodes around the selected first sensing electrode while performing tactile-proximity sensing.

24. The sensing device for tactile-proximity sensing in claim 15, wherein the capacitance sensing circuit further sends a shielding signal with same phase as that of the force capacitance-exciting signal to the non-selected first sensing electrode while performing force sensing.

25. The sensing device for tactile-proximity sensing in claim 15, wherein the touch control capacitance-exciting signal and the force capacitance-exciting signal are time varying signals or current sources.

26. The sensing device for tactile-proximity sensing in claim 25, wherein the force counter-exciting signal is a dc reference signal or a time varying signal with phase opposite to that of the force capacitance-exciting signal.

27. The sensing device for tactile-proximity sensing in claim 26, the dc reference signal is a zero volt signal.

* * * * *